(12) United States Patent
Aal (10) Patent No.: US 12,488,148 B2
(45) Date of Patent: Dec. 2, 2025

(54) METHODS AND APPARATUSES FOR CYBER SECURITY ENHANCEMENT

(71) Applicant: Volkswagen Aktiengesellschaft, Wolfsburg (DE)

(72) Inventor: Andreas Aal, Braunschweig (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 67 days.

(21) Appl. No.: 18/692,242

(22) PCT Filed: Sep. 17, 2021

(86) PCT No.: PCT/EP2021/075731
§ 371 (c)(1),
(2) Date: Mar. 14, 2024

(87) PCT Pub. No.: WO2023/041178
PCT Pub. Date: Mar. 23, 2023

(65) Prior Publication Data
US 2024/0411928 A1 Dec. 12, 2024

(51) Int. Cl.
*G06F 21/62* (2013.01)
*G06F 21/75* (2013.01)
*G06F 21/76* (2013.01)

(52) U.S. Cl.
CPC .......... *G06F 21/6254* (2013.01); *G06F 21/75* (2013.01); *G06F 21/755* (2017.08);
(Continued)

(58) Field of Classification Search
CPC ........... G06F 21/6254; G06F 2221/034; G06F 21/75; G06F 21/755; G06F 21/756; H04L 2209/12; H04L 2209/16
(Continued)

(56) References Cited

U.S. PATENT DOCUMENTS 10,331,912 B2 6/2019 Guilley et al.
2008/0163371 A1 7/2008 Bonizec et al. ................. 726/22
(Continued)

FOREIGN PATENT DOCUMENTS

EP 3726394 A1 10/2020
WO 2018/174819 A1 9/2018
WO 2023/041178 A1 3/2023

OTHER PUBLICATIONS

Wu et al. "TPAD: Hardware Trojan Prevention and Detection for Trusted Integrated Circuits", IEEE, vol. 35, No. 4, pp. 521-532, Apr. 2016 (Year: 2016).*

(Continued)

*Primary Examiner* — Thanh T Le
(74) *Attorney, Agent, or Firm* — Slayden Grubert Beard PLLC (57) ABSTRACT

The disclosure describes a method of providing cyber security enhancement, comprising: receiving an input signal via a first hardware sub-circuit of a hardware circuit and processing the received input signal into at least one of a first processed signal according to a first type of processing and a second processed signal according to a second type of processing being different to the first type of processing; deriving from only from one of the first processed signal and/or second processed signal a first output signal; transmitting the first output signal to a second hardware sub-circuit of the hardware circuit; and detecting from which of the first processed signal and/or second processed signal the transmitted first output signal is derived from and processing the transmitted first output signal into a second output signal in dependency from result of the detection.

20 Claims, 2 Drawing Sheets

(52) U.S. Cl.
CPC ........ *G06F 21/76* (2013.01); *G06F 2221/034* (2013.01); *H04L 2209/12* (2013.01); *H04L 2209/16* (2013.01)

(58) Field of Classification Search
USPC .......................................................... 726/23
See application file for complete search history.

(56) References Cited

U.S. PATENT DOCUMENTS

| | | | |
|---|---|---|---|
| 2009/0254738 A1* | 10/2009 | Sato | G06F 21/52 712/241 |
| 2009/0290709 A1* | 11/2009 | Macdonald | H04N 21/4405 380/200 |
| 2012/0124669 A1* | 5/2012 | Carpenter | G06F 21/71 726/25 |
| 2017/0288855 A1 | 10/2017 | Kumar et al. | |
| 2018/0103018 A1* | 4/2018 | Chauhan | H04L 63/0485 |
| 2019/0242946 A1 | 8/2019 | Ghalaty | |
| 2020/0226492 A1 | 7/2020 | Madani et al. | |
| 2020/0394340 A1* | 12/2020 | Wu | G06F 21/568 |
| 2021/0397747 A1* | 12/2021 | Moran | H04L 9/0631 |
| 2022/0366113 A1* | 11/2022 | Song | G06F 30/327 |

OTHER PUBLICATIONS

International Search Report and Written Opinion, Application No. PCT/EP2021/075731, 11 pages.

\* cited by examiner

METHODS AND APPARATUSES FOR CYBER SECURITY ENHANCEMENT

CROSS-REFERENCE TO RELATED APPLICATIONS

This application is a U.S. National Stage Application of International Application No. PCT/EP2021/075731 filed Sep. 17, 2021, which designates the United States of America, the contents of which are hereby incorporated by reference in their entirety.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

The disclosure relates to methods and apparatuses for cyber security enhancement in general and especially to a method of providing cyber security enhancement, to the use of a hardware circuit for providing cyber security enhancement and to a system for providing cyber security enhancement, in each case in particular by obfuscating a signal processing.

As it is known, the risk of cyber-attacks is increasing at an alarming rate in many areas of modern industrial or technological applications, such as on networks, computer systems, cyber-physical systems, robots or automotive applications. This relates to software attacks and to hardware attacks and hence, there is an increased need of protection of such and other applications against theft or damage to the hardware and/or software or the data they process, as well as against disruption or misuse of the services and functions they provide.

Regarding hardware attacks in more detail, these kinds of attacks are potentially more devastating, as they are promising a kind of long-term, stealth access. Chip attacks in particular should be mentioned here, for example by using tiny chips to infiltrate the motherboard's original design. In this regard, hardware Trojans (subsequently also denoted as HW Trojans) may be incorporated, which are triggered generally rarely, as usually certain events combination have to be met, and/or delayed, i.e., due to an aging dependent event delay in particular until the Trojans are widely distributed in industry.

Thus by incorporating or infiltrating HW Trojans, a malicious hardware modification can be smuggled in during hardware design or manufacturing, such as a functional modification, e.g. by the addition or subtraction of logic gates within the signal execution path, or as a parametric modification, e.g. by the deviation from the design-rule compliant cell, like an artificially increasing of the interconnect length on a chip for an intended delay insertion and/or for creating an otherwise non-functional interconnect scheme that can act for example as antenna to feed external signals into the hardware.

If however, a HW Trojan has been introduced, this usually requires a very time-consuming, thorough, invasive and/or destructive analysis of every component of the hardware, e.g. on a control board, in order to locate the HW Trojan, and even this does not guarantee that it will actually be found. In addition, such an infiltration is usually only noticed when it becomes apparent through its damaging modification. Regarding automotive applications for example, a vehicle recall and change of hardware may be the result and/or a homologation may be eventually blocked in total.

As it is in principle known, especially current electric/electronic vehicle architectures are considered by experts as easy to hack. It is assumed, that no current approaches, also with TPM (Trusted Platform Module) chips etc., will be able to close security gaps that relate to an "old" architecture backbone never intended to work in a cyber-critical environment.

The combination of this old architecture however, with the new IT/electronic ecosystem (i.e., essentially inter-industrial company networks for the conception and realization of customer and consumer solutions) leads to the issues that this disclosure tries to prevent.

Thus, there is the need to focus on the current emerging or even increasing issue of HW Trojans across in the whole electronics industry, in particular as the hardware root of trust no longer exists and cyber security is no longer a software topic alone, but rather an increasing hardware topic.

SUMMARY

A need exists to provide a new HW Trojan resilient approach, in particular a new way of building a HW Trojan resilient architecture.

The need is addressed by the subject matter of the independent claim(s). Embodiments of the invention are described in the dependent claims, the following description, and the drawings.

DESCRIPTION

The details of one or more embodiments are set forth in the accompanying drawings and the description below. Other features will be apparent from the description, drawings, and from the claims.

In the following description of embodiments of the invention, specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

In some embodiments, a method of providing a cyber security enhancement is proposed, in particular by obfuscating a signal processing, a method comprising the steps of receiving an input signal via a first hardware sub-circuit of a hardware circuit and processing the received input signal into at least one of a first processed signal according to a first type of processing and of a second processed signal according to a second type of processing being different to the first type of processing, and of deriving from only from one of the first processed signal and/or the second processed signal a first output signal.

Thereafter, the first output signal is transmitted to a second hardware sub-circuit of the hardware circuit, and it is detected from which of the first processed signal and/or the second processed signal the transmitted first output signal is derived from prior to processing the transmitted first output signal into a second output signal and then, the transmitted first output signal is processed into a second output signal in dependency from result of the detection.

A benefit is that an inserted or implanted HW Trojan, which generally is triggered at certain event or event combination, does not know the real design of the signal processing and hence, the HW Trojan typically does not match to the circuit and therefore is not effective.

In particular for implanting the afore summarized method, the teachings herein further suggest for providing a cyber security enhancement, in particular by obfuscating a signal processing, to use a hardware circuit comprising a first hardware sub-circuit having a first interface and a second interface, a second hardware sub-circuit having a third interface and a fourth interface, with each of the first, second, third and fourth interfaces being a defined interface. The first interface has to be connected with a signal input circuit at least for receiving an input signal from the input circuit, wherein the second interface being connected with the third interface at least for transmitting a first output signal coming from the first hardware sub-circuit to the second hardware sub-circuit and the fourth interface has to be connected with an output circuit at least for transmitting a second output signal to the output circuit.

In this regard it is furthermore supposed that the first hardware sub-circuit having an architecture for processing the received input signal into at least one of a first processed signal according to a first type of processing and of a second processed signal according to a second type of processing being different to the first type of processing, wherein the architecture being constructed for deriving the first output signal for the transmission to the second hardware sub-circuit in each case only from one of the first processed signal and/or the second processed signal, and wherein the second hardware sub-circuit having a functionality, in particular a defined fixed-hardware functionality, constructed to detect from which of the first processed signal and/or the second processed signal the first output signal is derived from and to process the first output signal into the second output signal in dependency from result of the detection.

Thus, the hardware ("HW") construction provides a HW obfuscation that can be used for obscuring and/or hiding the signal processing, in particular including the true meaning of a signal message or the functionality of a product.

Accordingly, the teachings herein are furthermore suggesting for providing a cyber security enhancement, in particular by obfuscating a signal processing, a system comprising a hardware circuit, with the hardware circuit is comprising a first hardware sub-circuit having a first interface and a second interface and a second hardware sub-circuit having a third interface and a fourth interface, with each of the first, second, third and fourth interfaces being a defined interface.

Within the system, the first interface being connected with a signal input circuit at least for receiving an input signal from the input circuit, the second interface being connected with the third interface at least for transmitting a first output signal coming from the first hardware sub-circuit to the second hardware sub-circuit and the fourth interface being connected with an output circuit at least for transmitting a second output signal to the output circuit. Furthermore, the first hardware sub-circuit having an architecture for processing the received input signal into at least one of a first processed signal according to a first type of processing and of a second processed signal according to a second type of processing being different to the first type of processing, wherein the architecture being constructed for deriving the first output signal for the transmission to the second hardware sub-circuit in each case only from one of the first processed signal and/or the second processed signal, and the second hardware sub-circuit having a functionality, in particular a defined fixed-hardware functionality, constructed to detect from which of the first processed signal and/or the second processed signal the first output signal is derived from and to process the first output signal into the second output signal in dependency from result of the detection.

The system is thus providing similar benefits compared to the above summarized method and use, and as the output of the first output signal in principle is unpredictable, it is more difficult to predefine a HW Trojans attack mode and hence, the probability of occurrence of a trigger event activating the HW Trojans is drastically reduced.

In some embodiments, the respectively used hardware circuit or the entire system is part of a SoC or of a multichip-configuration. In particular, for providing a flexible architecture of the first hardware sub-circuit, the first hardware sub-circuit for example is supplementary or alternatively built as a reconfigurable circuit, in particular as a FPGA (Field Programmable Gate Array).

Thus, with such a re-configuration-based circuit, in principle, any HW unit may be modified into a moving target, rather than a determined attack node and the resistance to essentially any HW attack can consequently be increased again.

In particular for monitoring and/or for controlling the signal processing behavior from externally, in some embodiments it is supplementary or alternatively suggested, that at least the first hardware sub-circuit is connected with a transmitter/receiver adapted to transmit the signal derived from only the one of the first processed signal and/or the second processed signal to a remote control computing system and to receive a control signal from the remote control computing system.

In this regard, it is furthermore suggested in practical embodiments that the transmitter/receiver is a wireless transmitter/receiver, at least partially, and/or the remote control computing system is constructed as a central cloud computing system or being at least part of a central cloud computing system.

In some embodiments, it is supplementary or alternatively suggested, in particular for providing an again increased flexibility of withstanding cyber-attack, incident, disaster and failure and/or of adapting from a post cyber incident situation, the first hardware sub-circuit for example is set up for its own reconfiguration, in particular by the functionality of changing or selecting the first type of processing, the second type of processing, and/or the processed signal from which the first output signal is derived, for example in response to a control signal, in particular in response to a control signal received from a remote control computing system.

In some embodiments, the second hardware sub-circuit for example has a functionality, in particular a fixed-hardware functionality, composed of a switch and a plurality of processing paths, with the first hardware sub-circuit for example set up to generate a trigger-signal in dependency of deriving the first output signal from the one of the first processed signal and/or the second processed signal and with the switch being linked with the first hardware sub-circuit via the second and third interfaces to receive the trigger-signal for detecting from which of the first processed signal and/or the second processed signal the transmitted first output signal is derived and is set up to select in response to the reception of the trigger-signal one processing path out of the plurality of processing paths. By such a composition, a recovering of the second hardware sub-circuit from cyber incident and failure can be easily performed.

In particular, for still enabling the manufacturing of only one second hardware circuit, in some embodiments, it is suggested, that the first processed signal and the second processed signal having in each case the same and equal information content to each other, i.e., in particular to build up the first type of processing and the second type of processing such that the first processed signal and the second processed signal having in each case the same and equal information content to each other.

In some embodiments, it is supplementary or alternatively suggested, the first hardware sub-circuit and the second hardware sub-circuits are tuned to each other for generating the second output signal with the useful content of which being the same by transmitting the first output signal deriving from the first processed signal as by transmitting the first output signal deriving from the second path.

In some embodiments, it is supplementary or alternatively suggested, that the first type of processing, the second type of processing or a further different type of processing is embedded within a dead end processing path to be used only for obfuscation, covering a real type of processing, hence in particular enabling a shadowing of data.

For some embodiments, it is supplementary or alternatively particularly suitable that the second type of processing being different to the first type of processing first with regard to at least one of timing behavior, frequency behavior, multiplexing functionality, signal modification, modulation transfer function and signal transformation.

Further features of the taught subject matter and benefits achieved therewith are described in the following considering various embodiments based on the enclosed drawings, in which the various elements of embodiments will be given numerical designations and in which further embodiments will be discussed.

Specific references to components, process steps, and other elements are not intended to be limiting. Further, it is understood that like parts bear the same or similar reference numerals when referring to alternate FIGS.

Figure 1:
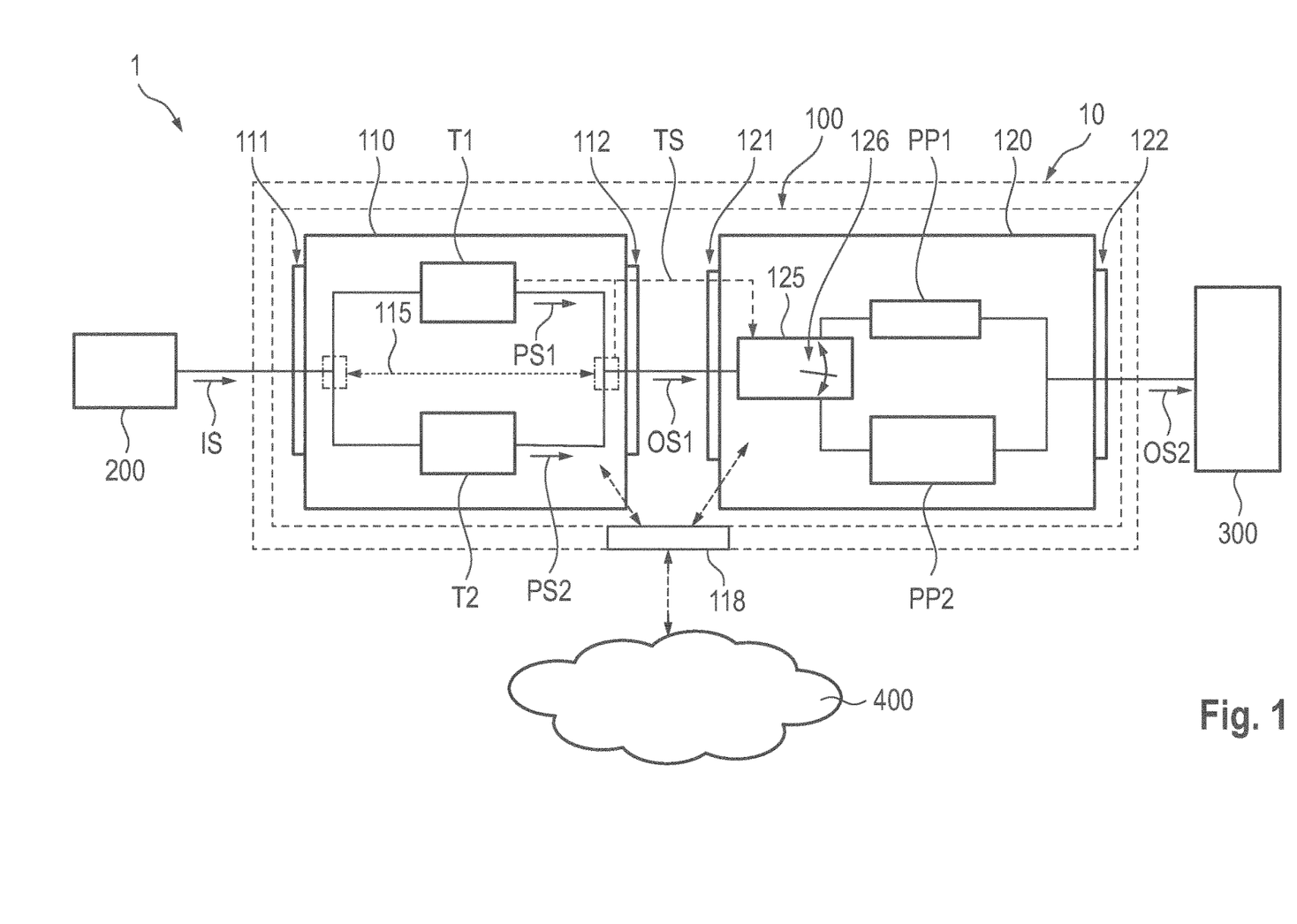
FIG. 1 shows a basic functional diagram of an example of interconnection of several circuit blocks for providing cyber security enhancement, in particular by obfuscating a signal processing according to a taught solution.

Referring to FIG. 1, a basic functional diagram of an example of the interconnection of several circuit blocks for providing cyber security enhancement according to embodiments is schematically illustrated.

A hardware circuit 100 is depicted, which in particular is part of a chip-based module 10, for example of a SoC or of a multichip-configuration. As can be seen in FIG. 1, the hardware circuit 100 comprises a first hardware sub-circuit 110 and at least a second hardware sub-circuit 120. Each of the hardware sub-circuits at least has two interfaces for the interconnection with a component to an input side and to an output side of the respective sub-circuit and hence, usually being defined interfaces.

Accordingly, a first interface 111 and a second interface 112 is part of the first hardware sub-circuit 110 and a third interface 121 and a fourth interface 122 is part of the second hardware sub-circuit 120.

For using the hardware circuit 100 for providing cyber security enhancement, the first interface 111 has to be connected with a signal input circuit 200 and for receiving an input signal IS from the input circuit 200. The second interface 112 is connected with the third interface 121 at least for transmitting a first output signal OS1 coming from the first hardware sub-circuit 110 to the second hardware sub-circuit 120. The fourth interface 122 has to be connected with an output circuit 300 and for transmitting a second output signal OS2 to the output circuit 300.

According to the sketch of FIG. 1, the signal input circuit 200 and the output circuit 300 are both located outside the hardware circuit 100. As an alternative, however, the signal input circuit 200 and/or output circuit 300 can be part of a chip-based module, too. In particular within a system 1 comprising such a hardware circuit 100 and with each of the first, second, third and fourth interfaces 111, 112, 121, 122 already being correspondingly connected, of course such an input circuit 200 and/or output circuit 300 can be part of a chip-based module, too.

Furthermore, such an input circuit 200 and/or output circuit 300 can be generally designed as any kind of circuit block for example having a defined fixed hardware-defined functionality. Supplementary or alternatively, such an input circuit and/or output circuit may have again interfaces as described above (which are not depicted for reasons of clarity) and/or terminals for the electrical connection with the periphery.

One feature, in particular for providing cyber security enhancement by obfuscating the signal processing, is, that the first hardware sub-circuit 110 has an architecture for processing the received input signal IS into at least one of a first processed signal PS1 according to a first type of processing T1 and a second processed signal PS2 according to a second type of processing T2 being different to the first type of processing.

Moreover, the architecture being constructed for deriving the first output signal OS1 for the transmission to the second hardware sub-circuit 120 in each case only from one of the first processed signal and/or the second processed signal. In this regard, a switching or selector component 115 can be incorporated that is arranged before and/or after the at least two types of signal processing of the first hardware sub-circuit 110 for example. In particular a controllable switching or selector component 115. In particular based on the respective industrial or technological application and/or on the requirements involved by the use of the teachings herein, with such a switch, the received input signal IS can be supplied for example, to all or selected ones of the at least two types of processing and/or the first output signal OS1 can be derived from only one of the first processed signal and/or second processed signal.

In addition, the second hardware sub-circuit 120 has a functionality, in particular a defined fixed-hardware functionality, constructed to detect from which of the first processed signal and/or the second processed signal the first output signal OS1 is derived from and to process the first output signal OS1 into the second output signal OS2 in dependency from result of the detection. In this regard for example, a detector component 125 can be incorporated to which the first output signal OS1 is guided and from which the first output signal OS1 then is passed in dependency from result of the detection, through a first processing path PP1 or through a second processing path PP2.

It has to be mentioned however, that the terminology of "a first processed signal PS1 according to a first type of processing T1 and a second processed signal PS2 according to a second type of processing T2 being different to the first type of processing" is to be understand within the scope of the teachings herein, is not to be understand as the maximum number, but also covers number of more than two types of processing and hence even more than only a number of two processed signal could be incorporated with the first hardware sub-circuit 110. Correspondingly, even more than only a number of two processing paths could be incorporated with the second hardware sub-circuit 120.

Thus, for example by using the afore-described hardware circuit 100 and/or in particular based of the afore-described system, a method of providing cyber security enhancement, in particular by obfuscating a signal processing, can be performed, in that an input signal IS via a first hardware sub-circuit 110 of a hardware circuit 100 is received and thereafter is processed into at least one of a first processed signal PS1 according to a first type of processing T1 and of a second processed signal PS2 according to a second type of processing T2 being different to the first type of processing (FIG. 1).

As can be further seen in FIG. 1, based from only from one of the first processed signal PS1 and/or the second processed signal PS2 however, a first output signal OS1 is derived and transmitted to a second hardware sub-circuit 120 of the hardware circuit 100. Thereafter and upon detecting from which of the first processed signal PS1 and/or the second processed signal PS2 the transmitted first output signal OS1 is derived from, the transmitted first output signal OS1 can be processed into a second output signal OS2 in dependency from result of the detection.

While the second hardware sub-circuit 120 can be for example constructed as a fixed-hardware sub-circuit, the first hardware sub-circuit 110 is for example constructed as a reconfigurable hardware sub-circuit, such as a FPGA. The signal input circuit 200 and/or the output circuit 300 being for example constructed as a respective fixed-hardware circuit, too. As it is known, usually the functionality of a system processing an input signal received from a signal input circuit into an output signal to be forwarded to an output circuit is such, that the output signal depends on the input signal, i.e. equal input signals are processed into equal output signals, possibly depending on a previous signal state.

By use of the first hardware sub-circuit 110 however, signals with different signal characteristics can be generated, e.g. the first output signal OS1 based on signal PS1 or signal PS2 according to FIG. 1, despite the same input signal, e.g. input signal IS according to FIG. 1.

In case, a HW Trojan is implemented within second hardware sub-circuit 120 during manufacturing for example, the certain event or certain event combination according to which the HW Trojan will be triggered is already defined. As however, the processing of the first output signal OS1 into the second output signal OS2 depends on the first output signal OS1, the processing behavior of the first hardware sub-circuit 110 can be defined still during the last step of manufacturing, i.e. when the first hardware sub-circuit 110 is installed, or in case of constructing the first hardware sub-circuit 110 as a reconfigurable hardware sub-circuit, such as a FPGA, even during operation and/or maintenance. Thus, critical issues with regard to certain trigger events or event combinations, such as for example a certain timing and/or frequency behavior but also certain multiplexed and/or carrier signals, can be set only during the last step of manufacturing or still changed or modified during operation and/or maintenance.

Thus, even if it is for example provided, that the same and equal information content is transmitted independent of processing a current input signal IS into the first processed signal PS1 or into the second processed signal PS2 the respective signal behaviors and/or characteristics can be generated different to each other, resulting to a kind of "security firewall".

If for example, the first type of processing T1 is constructed to perform a fast signal processing and the second type of processing T2 is constructed to perform a slow signal processing, i.e., the second type of processing being different to the first type of processing first with regard to their respective timing behavior, the processed signals PS1 and/or PS2 being also different to each other concerning their respective signal behavior and/or characteristic but can still have the same and equal information content to each other.

Since however, the second hardware sub-circuit 120 is constructed to detect from which of the first processed signal and/or the second processed signal the first output signal OS1 is derived from, by use of the detector component 125 for example, the first output signal OS1 can be passed through the first processing path PP1 in case first output signal OS1 is derived from the first type of processing T1, i.e., from signal PS1, and can be passed through the second processing path PP2 in case first output signal OS1 is derived from the second type of processing T2, i.e., from signal PS2. Thus, based on this example, the first processing path PP1 can be constructed as a path proving a corresponding or suitable time-delay, whereas the second processing path PP2 can be constructed as a path proving a simple pass through without time-delay. Thus, the entire timing is always correct, but an already implanted HW Trojan gets only one time state and does not know the "last" state.

Of course, within the scope of the teachings herein even the second type of processing does not need to be different to the first type of processing first only with regard to timing behavior but in addition or alternatively with regard to frequency behavior, multiplexing functionality, signal modification, modulation transfer function and/or signal transformation or modification, such as an analog/digital conversion or not, for example. In principle, any signal transformation/re-transformation (datapath & logic) can be used.

With other words and for the practical use, the first hardware sub-circuit and the second hardware sub-circuit are for example tuned to each other for generating the second output signal with the useful content of which being the same by transmitting the first output signal deriving from the first processed signal as by transmitting the first output signal deriving from the second path.

Accordingly, with the taught approach, the same information content is transferred, but can be beneficially first transformed into different information formats and will be then retransformed.

Thus, by the first hardware sub-circuit 110, in principle the used HW design can be transformed to another one which is functionally equivalent to the original, but in which it is much harder for attackers to obtain complete understanding of the internal logic, making reverse engineering much more difficult to perform, as the functionality of a product is obscured, which is in particular securing the intellectual property innate in the product, too.

By using a second hardware sub-circuit, such as second hardware sub-circuit 120, having a functionality, in particular a fixed-hardware functionality, composed of a switch 126 and a plurality of processing paths for example, the first hardware sub-circuit is set up for example to generate a trigger-signal TS in dependency of deriving the first output signal OS1 from the one of the first processed signal PS1 and/or the second processed signal PS2 and with the switch 126 being linked with the first hardware sub-circuit via the second and third interfaces 112, 121 to receive the trigger-signal for detecting 125 from which of the first processed signal and/or the second processed signal the transmitted first output signal is derived and is set up to select in response to the reception of the trigger-signal one processing path out of the plurality of processing paths.

It has to be mentioned however, that the different types of processing, e.g. the first type of processing T1 and the second type of processing T2, and/or the different processing paths, e.g. the first processing path PP1 and the second processing path PP2, can be respectively integrated also within one electronic component, regardless of the manner of switch, detection and/or selection.

Figure 2A:
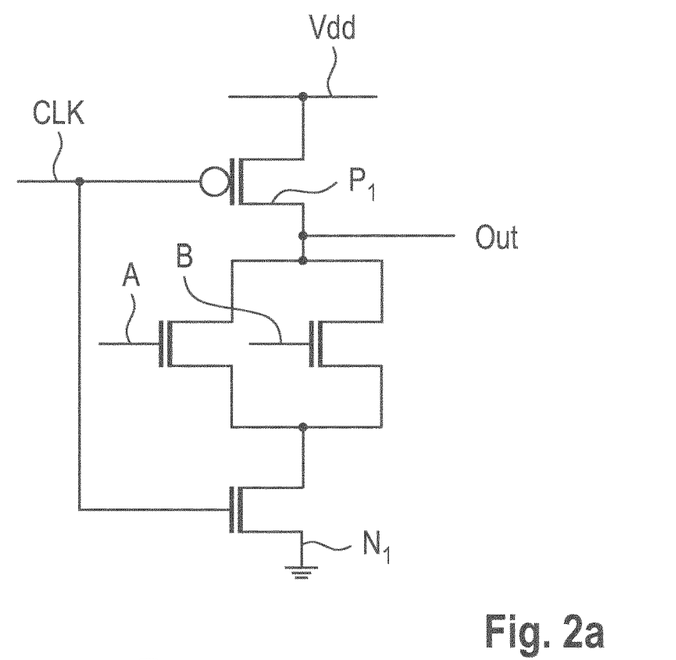
FIGS. 2a and 2b show an example of a hardware obfuscation according to embodiments.
Figure 2B:
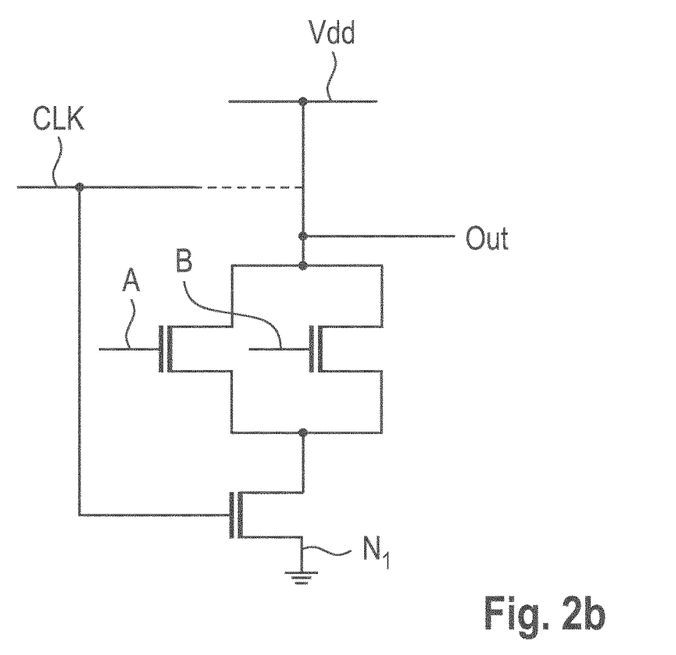

Referring to FIGS. 2*a* and 2*b*, depicting such an electronic component as a further example of a hardware obfuscation.

As can be seen, the electronic component includes a pMOS transistor@VDD. According to FIG. 2*b* however, the use of the pMOS transistor in this configuration is defacto a direct connection of the Output "Out" to Vdd, with negligible influence of the clock and the Inputs "A" and "B". Hence, in case a HW Trojans has been implemented with regard to a circuit function as appeared by the transistor according to FIG. 2*a*, i.e., that is targeted with regard to the clock or shall influencing the clock for example, such a HW Trojans has not malicious effect anymore concerning to a signal processing according to FIG. 2*b*.

As some further examples, obfuscation of an orthogonal frequency-division multiplexing (OFDM) physical layer and the expansion of the finite state machine (FSM) of a functional specification such that the added states and transitions are hidden in high-level design, for example with the obfuscation key itself being re-configurable, and are only known to the designers can listed, too.

Hence a plurality of different protocol and/or signal paths between electronic units, in particular computing units, may be hardware obfuscated with the help of the taught approach, in particular by the use of FPGA elements in SoCs or of a multichip-configurations or on printed circuit boards.

With the first hardware sub-circuit for example being set up for its own reconfiguration by the functionality of changing or selecting the first type of processing, the second type of processing, and/or the processed signal from which the first output signal is derived, for example by the switching or selector component 115 according to FIG. 1, for example in response to a control signal, in particular in response to a control signal received from a remote control computing system 400, it is also possible for example, to obfuscate a specified number of manufactures electronic units by a first kind of configuration and another number by another kind of configuration. This enables the creation of a number of possible hardware combinations for an attacker and accordingly drastically reduces efficient attack vectors.

In particular in this regard and/or by the use of multichip-configuration, the first type of processing T1, the second type of processing T2 or a further different type of processing can be furthermore embedded within a dead end processing path to be used only for obfuscation, covering a real type of processing.

As a result, without the need of changing hardware, implemented HW Trojans can be bypassed very effectively and with regard to the entire life cycle of such electronic units and in terms of the requirements of planning the electronic units together with the anticipation and prediction or forecast of a potential cyber-attack in readiness of an incident, of withstanding of cyber-attack incident, disaster and failure, of recovering the electronic units from cyber incident and failure and of adapting the electronic units from a post cyber incident situation. In particular by using a FPGA for the first hardware sub-circuit 110 a programmability can be achieved offering great freedom and flexibility.

Thus, in some embodiments, at least the first hardware sub-circuit is connected with a transmitter/receiver 118 adapted to at least transmit the signal OS1 derived from only the one of the first processed signal and/or the second processed signal to a remote control computing system 400 and to receive a control signal from the remote control computing system 400, as indicated in FIG. 1 by the dashed double arrows. For example, such a transmitter/receiver 118 is a wireless transmitter/receiver, at least in partial, and/or the remote control computing system 400 is at least part of central cloud computing system. It is mentioned however, that the afore-addressed preference of a wireless transmitter/receiver shall not limiting per se the option with regard to wired service actions.

Taking into account the above description, the following benefits and features in particular can also be summarized in a supplementary manner.

The obfuscated hardware executes the same function as the original hardware. The obfuscated hardware however, will only leak as much information that is available on the inputs and outputs, and hence in particular side channel attacks access a "noisy signal" only, rather than a clear response that allows conclusion about the design feature/function. In addition, while keeping the intended functionality, the degree of difficulty to understand that functionality from an outside perspective and/or reverse engineering perspective is increased and hence, it is more difficult to generate effective attack vectors. Thus, the HW obfuscation is used for obscuring and/or hiding the true meaning of a message or the functionality of a product. As a result, the obfuscation-based approach can be used to prevent the attacker from successfully reverse-engineering the functionality of any IP cores in an IC or on PCBA (printed circuit board assembly) level.

Hence, the probability of HW Trojans, which are included in electronics or a electronic compute units used during manufacturing process, being relevant for the applications functionality, such as a vehicle functionality for example, will be drastically reduced.

The obfuscated hardware can be therefore used in particular to support a HW Trojan resilient architecture including to improve HW Trojan prevention and also response after detection, in particular as the architecture is adaptable to HW Trojan trigger events, capable to handle intrusion and to reduce the probability of HW Trojan trigger events with impact and enabling fast recovery upon HW Trojan detection.

With a re-configuration-based logic, such as an FPGA, in principle any HW unit may be modified into a moving target, rather than a determined attack node, and can therefore withstand a HW attack. Even when Trojans would be part of IP, used for example in the SoCs, possible trigger could be set different, so the probability of occurrence, such as for a vehicle fleet, is drastically reduced and when triggered, the system would be adaptive (re-programming, resilient) and able to recover by reconfiguration after detection.

Thus, even the communication functionality between any central processing unit and zonal electronic controllers (ZeC) is more secure and resilient and can be adapted or recovered resulting in an additionally enhanced END-to-END security.

Since the obfuscation however, is not an encryption but the obfuscated function, is executable without de-obfuscation, any combination of encryption with obfuscation leads to an even higher security level.

LIST OF REFERENCE NUMERALS

1 System comprising a hardware circuit;
10 Chip-based module 10;
100 Hardware circuit;
110 First hardware sub-circuit;
111, 112 first and second interfaces being part of the first hardware sub-circuit;
115 Switching or selector component;
118 Transmitter/receiver;
120 Second hardware sub-circuit;
121, 122 third and fourth interfaces being part of the first hardware sub-circuit;
125 Detector component;
126 Switch;
200 Signal input circuit;
300 Output circuit 300;
400 Remote control computing system;
IS Input signal;
OS1 First output signal;
OS2 Second output signal;
PS1 First processed signal PS1;
T1 First type of processing;
PS2 Second processed signal;
T2 First type of processing;
PP1 First processing path;
PP2 Second processing path;
TS Trigger-signal.

The invention has been described in the preceding using various exemplary embodiments. Other variations to the disclosed embodiments may be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The term "exemplary" used throughout the specification means "serving as an example, instance, or exemplification" and does not mean "preferred" or "having advantages" over other embodiments. The term "in particular" and "particularly" used throughout the specification means "for example" or "for instance".

The mere fact that certain measures are recited in mutually different dependent claims or embodiments does not indicate that a combination of these measures cannot be used to advantage. Any reference signs in the claims should not be construed as limiting the scope.

What is claimed is:

1. A method of providing cyber security enhancement, in particular by obfuscating a signal processing comprising:
    receiving an input signal via a first hardware sub-circuit of a hardware circuit and processing the received input signal into a first processed signal according to a first type of processing, or into a second processed signal according to a second type of processing, or into the first processed signal and the second processed signal, wherein the second type of processing being different from the first type of processing;
    deriving a first output signal from only the first processed signal or from only the second processed signal;
    transmitting the first output signal to a second hardware sub-circuit of the hardware circuit; and
    detecting, whether the transmitted first output signal is derived from the first processed signal or from the second processed signal and processing the transmitted first output signal into a second output signal in dependence of the detection.

2. The method of claim 1, wherein the first hardware sub-circuit is a reconfigurable circuit.

3. The method of claim 1, wherein the first hardware sub-circuit is connected with a transmitter adapted to transmit the signal derived from only the one of the first processed signal or the second processed signal to a remote control computing system and to receive a control signal from the remote control computing system.

4. The method of claim 1, wherein the first hardware sub-circuit is configured for its own reconfiguration by a functionality of changing or selecting the first type of processing, the second type of processing, and/or the processed signal from which the first output signal is derived.

5. The method of claim 1, wherein the second hardware sub-circuit has a functionality, composed of a switch and a plurality of processing paths, with the first hardware sub-circuit configured to generate a trigger-signal in dependency of deriving the first output signal from the one of the first processed signal or the second processed signal and with the switch being linked with the first hardware sub-circuit via the second and third interfaces to receive the trigger-signal for detecting from which of the first processed signal or the second processed signal the transmitted first output signal is derived and is configured to select in response to the reception of the trigger-signal one processing path out of the plurality of processing paths.

6. The method of claim 1, wherein the second type of processing being different to the first type of processing first with regard to timing behavior and/or frequency behavior.

7. The method of claim 1, wherein the second type of processing being different to the first type of processing first with regard to multiplexing functionality and/or signal modification.

8. The method of claim 1, wherein the second type of processing being different to the first type of processing first with regard to modulation transfer function and/or signal transformation.

9. The method of claim 1, wherein the first processed signal and the second processed signal having the same information content.

10. The method of claim 1, wherein the first hardware sub-circuit and the second hardware sub-circuits are tuned to each other for generating the second output signal with the same information content.

11. The method of claim 1, wherein the first type of processing, the second type of processing or a further different type of processing is embedded within a dead end processing path to be used only for obfuscation, covering a real type of processing.

12. A method of using a hardware circuit for providing cyber security enhancement, in particular by obfuscating a signal processing, the hardware circuit comprising:
    a first hardware sub-circuit having a first interface and a second interface;
    a second hardware sub-circuit having a third interface and a fourth interface;
    each of the first, second, third and fourth interfaces being a defined interface; and wherein
        the first interface to be connected with a signal input circuit and for receiving an input signal from the signal input circuit;
        the second interface being connected with the third interface at least for transmitting a first output signal coming from the first hardware sub-circuit to the second hardware sub-circuit and the fourth interface to be connected with an output circuit and for transmitting a second output signal to the output circuit; the method comprising:

processing the received input signal into a first processed signal according to a first type of processing, or into a second processed signal according to a second type of processing, or into the first processed signal and the second processed signal, wherein the second type of processing being different from the first type of processing;

deriving the first output signal from only first processed signal or from only the second processed signal;

transmitting the first output signal to the second hardware sub-circuit of the hardware circuit; and detecting, whether the transmitted first output signal is derived from the first processed signal or from the second processed signal and processing the transmitted first output signal into the second output signal in dependence of the detection.

13. The method of claim 12, wherein the hardware circuit is part of a SoC or of a multichip-configuration.

14. The method of claim 12, wherein the first hardware sub-circuit is a reconfigurable circuit.

15. The method of claim 12, wherein the first hardware sub-circuit is connected with a transmitter adapted to transmit the signal derived from only the one of the first processed signal or the second processed signal to a remote control computing system and to receive a control signal from the remote control computing system.

16. A system for providing cyber security enhancement, in particular by obfuscating a signal processing, comprising a hardware circuit, the hardware circuit comprising:

a first hardware sub-circuit having a first interface and a second interface;

a second hardware sub-circuit having a third interface and a fourth interface;

each of the first, second, third, and fourth interfaces being a defined interface;

the first interface being connected with a signal input circuit and for receiving an input signal from the signal input circuit;

the second interface being connected with the third interface at least for transmitting a first output signal coming from the first hardware sub-circuit to the second hardware sub-circuit, the fourth interface being connected with an output circuit and for transmitting a second output signal to the output circuit;

the first hardware sub-circuit having an architecture for processing the received input signal into a first processed signal according to a first type of processing, or into a second processed signal according to a second type of processing, or into the first processed signal and the second processed signal, wherein the second type of processing being different to the first type of processing;

wherein the architecture being constructed for deriving the first output signal for the transmission to the second hardware sub-circuit only from the first processed signal or only from the second processed signal; and wherein the second hardware sub-circuit having a functionality, in particular a defined fixed-hardware functionality, constructed to detect whether the first output signal is derived from the first processed signal or the second processed signal and to process the first output signal into the second output signal in dependence of the detection.

17. The system of claim 16, wherein the system is part of a SoC or of a multichip-configuration.

18. The system of claim 16, wherein the first hardware sub-circuit is a reconfigurable circuit.

19. The system of claim 16, wherein the first hardware sub-circuit is connected with a transmitter adapted to transmit the signal derived from only the one of the first processed signal or the second processed signal to a remote control computing system and to receive a control signal from the remote control computing system.

20. The system of claim 16, wherein the first hardware sub-circuit is configured for its own reconfiguration by a functionality of changing or selecting the first type of processing, the second type of processing, and/or the processed signal from which the first output signal is derived.

* * * * *